United States Patent
Tang

(10) Patent No.: US 8,760,865 B2
(45) Date of Patent: Jun. 24, 2014

(54) COMPUTER CASING HAVING LIQUID COOLING UNIT

(75) Inventor: Xian-Xiu Tang, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 196 days.

(21) Appl. No.: 13/316,458

(22) Filed: Dec. 10, 2011

(65) Prior Publication Data

US 2012/0314364 A1 Dec. 13, 2012

(30) Foreign Application Priority Data

Jun. 9, 2011 (CN) .......................... 2011 1 0154000

(51) Int. Cl.
*H05K 7/20* (2006.01)

(52) U.S. Cl.
USPC .................. 361/679.54; 361/679.53; 361/698; 361/699; 361/714; 165/80.2; 165/80.3; 165/80.4; 165/80.5; 165/104.33; 62/259.2

(58) Field of Classification Search
USPC ........................ 361/679.46–679.55, 688, 689, 361/692–697, 698, 699, 714–727; 165/80.2–80.5, 121–126, 104.33, 165/104.34, 104.21, 104.31, 185; 62/3.2, 62/3.3, 3.6, 3.7, 259.2; 174/50, 50.02, 174/15.1, 16.3; 454/184; 312/223.2
See application file for complete search history.

(56) References Cited

U.S. PATENT DOCUMENTS

| | | | | | |
|---|---|---|---|---|---|
| 5,323,847 | A | * | 6/1994 | Koizumi et al. | 165/104.33 |
| 5,731,954 | A | * | 3/1998 | Cheon | 361/699 |
| 5,940,270 | A | * | 8/1999 | Puckett | 361/699 |
| 6,234,240 | B1 | * | 5/2001 | Cheon | 165/80.3 |
| 6,313,990 | B1 | * | 11/2001 | Cheon | 361/699 |
| 6,504,719 | B2 | * | 1/2003 | Konstad et al. | 361/698 |
| 6,725,682 | B2 | * | 4/2004 | Scott | 62/259.2 |
| 6,747,869 | B2 | * | 6/2004 | Dong | 361/679.52 |
| 6,778,394 | B2 | * | 8/2004 | Oikawa et al. | 361/700 |
| 6,950,303 | B2 | * | 9/2005 | Neho et al. | 361/679.08 |
| 7,021,367 | B2 | * | 4/2006 | Oikawa | 165/80.4 |
| 7,142,425 | B2 | * | 11/2006 | Tomioka et al. | 361/699 |
| 7,209,355 | B2 | * | 4/2007 | Koga et al. | 361/699 |
| 7,624,789 | B2 | * | 12/2009 | Minamitani et al. | 165/104.33 |
| 7,739,883 | B2 | * | 6/2010 | Scott | 62/259.2 |
| 7,971,632 | B2 | * | 7/2011 | Eriksen | 165/80.4 |
| 2003/0151892 | A1 | * | 8/2003 | Kondo et al. | 361/687 |
| 2004/0008475 | A1 | * | 1/2004 | Ohashi et al. | 361/681 |
| 2006/0039112 | A1 | * | 2/2006 | Minamitani et al. | 361/699 |
| 2009/0084525 | A1 | * | 4/2009 | Satou et al. | 165/104.21 |

* cited by examiner

*Primary Examiner* — Michail V Datskovskiy
(74) *Attorney, Agent, or Firm* — Novak Druce Connolly Bove + Quigg LLP

(57) ABSTRACT

A computer casing includes several electronic components, a first heat sink, a side plate, a second heat sink, a container, a pump, and a tube. The first heat sink is attached to an electronic component, and defines a channel including an inlet and an outlet. The side plate defines an opening. The second heat sink is fixed to the side plate and covers the opening. The second heat sink includes a first side facing the opening and an opposite side external to the side plate. The container is used to store coolant and is fixed to the first side of the second heat sink. A pump is connected to the container. The tube includes a first end connected to the pump and a second end connected to the inlet of the channel of the first heat sink, and stays in contact with the first side of the second heat sink.

5 Claims, 4 Drawing Sheets

COMPUTER CASING HAVING LIQUID COOLING UNIT

BACKGROUND

1. Technical Field

The present disclosure relates to computer casings, and particularly, to a computer casing including a liquid cooling unit.

2. Description of Related Art

Increasingly powerful electronic components, such as computer chips or central processing units (CPUs), produce higher wattages of waste heat, which must be continually removed in order to allow the component to operate efficiently. Generally, one planar surface of such a component is exposed, usually indirectly exposed through a thin cover or "lid," and heat is extracted by some type of add-on cooling assembly that is thermally bonded to the exposed surface. Early on, a relatively simple heat sink, generally a metal plate with cooling fins, was bonded to the exposed surface of the component, and a fan mounted somewhere on or inside the computer case forced air over the cooling fins and out of the case. This worked sufficiently well until CPUs became too powerful and generate too much heat, and liquid cooling became necessary.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

Embodiments of the present disclosure will now be described in detail with reference to the accompanying drawings.

Figure 1:
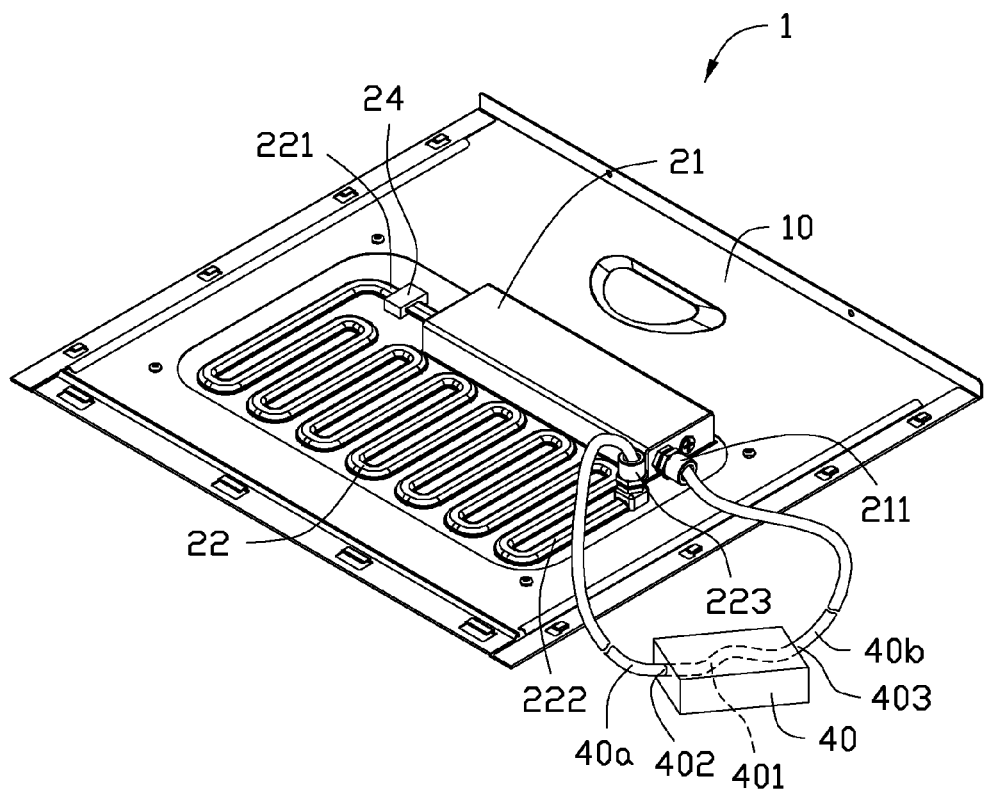
FIG. 1 is an isometric view showing a side panel and a liquid cooling unit of a computer casing in accordance with an exemplary embodiment.
Figure 3:
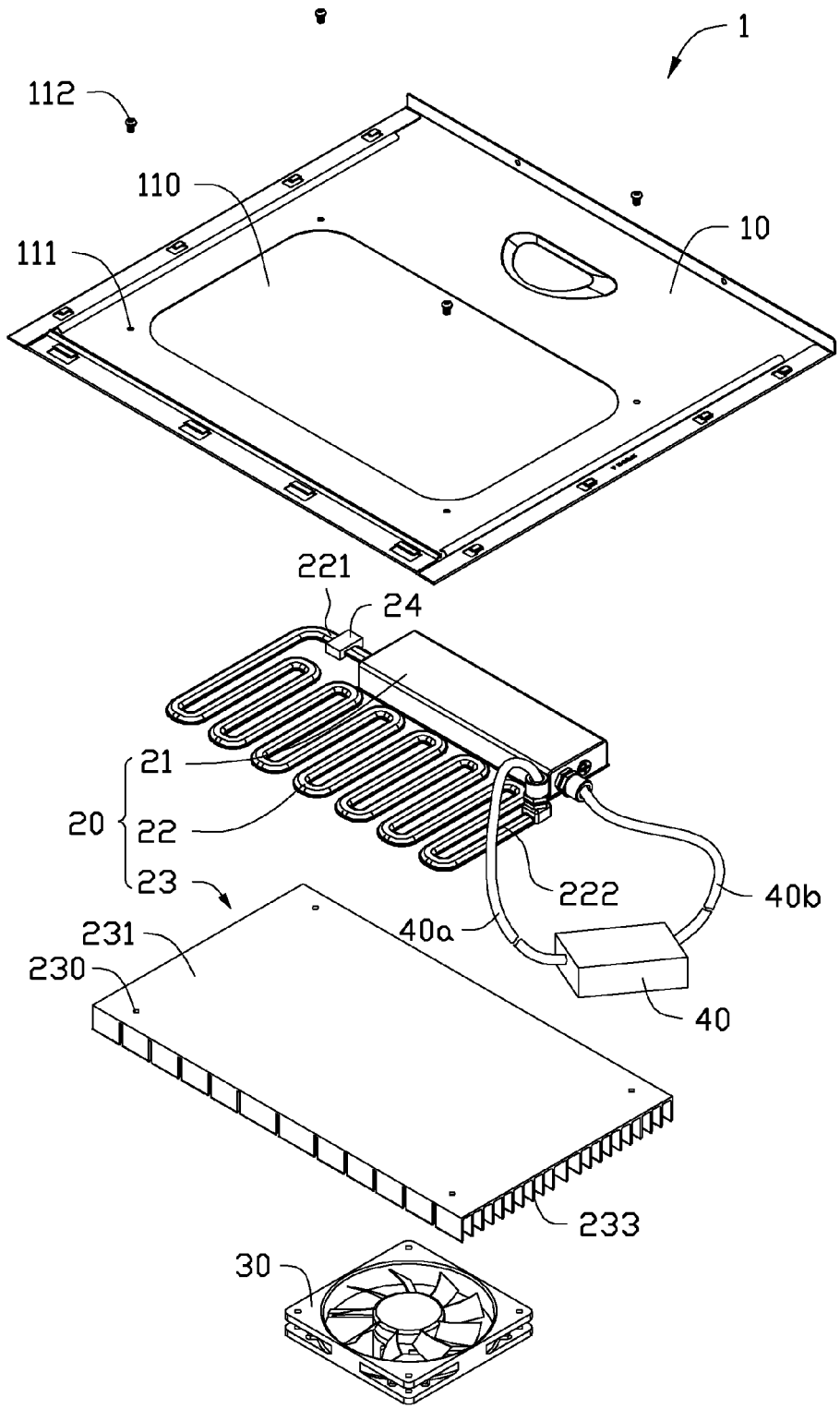
FIG. 3 is an isometric, exploded view of the computer casing of FIG. 1.
Figure 4:
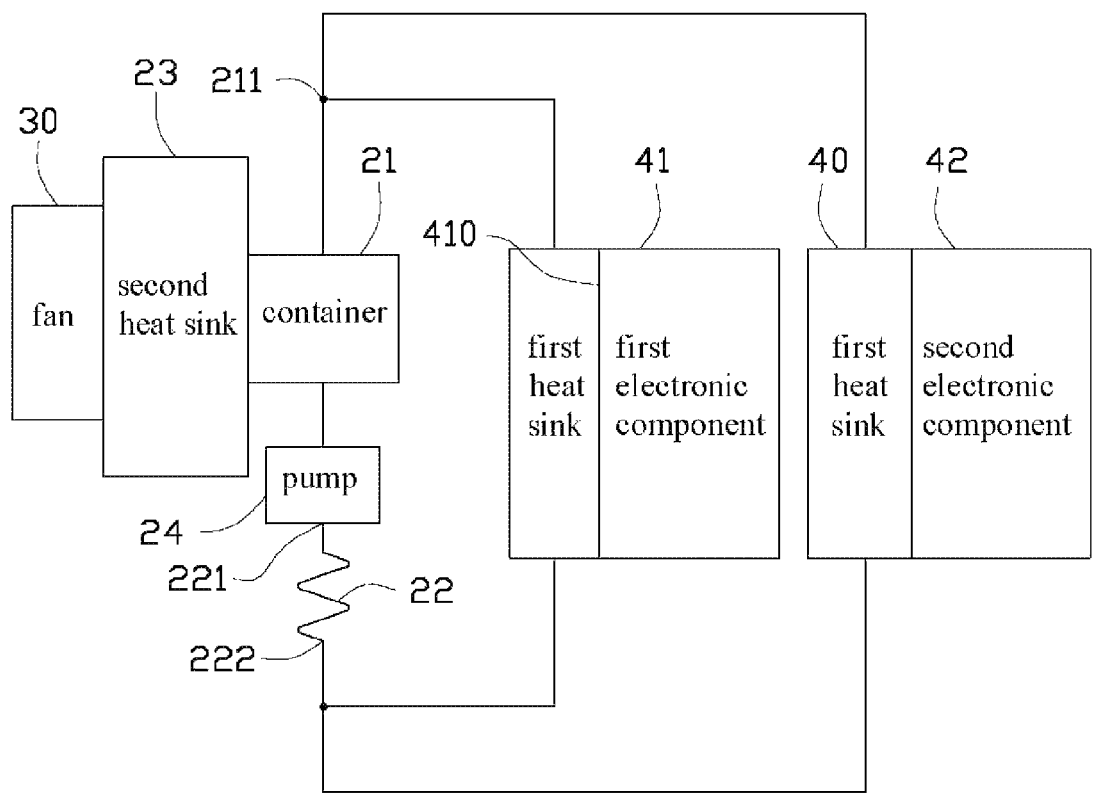
FIG. 4 is a block diagram of the computer casing of FIG. 1.

Referring to FIGS. 1, 3 and 4, a computer casing 1 includes a side panel 10 and a liquid cooling assembly 20 to cool the electronic components within the casing 1. A circuit board is fixed in the casing 1 and includes a number of electronic components. In the embodiment, the electronic components include a first electronic component 41 and a second component 42, such as a central processing unit (CPU) and a graphics processing unit that produce a large amount of heat when working. Two first heat sinks 40 are attached to the electronic components 42 and 42. Each heat sink 40 defines a channel 401 including an inlet 402 and an outlet 403.

Figure 2:
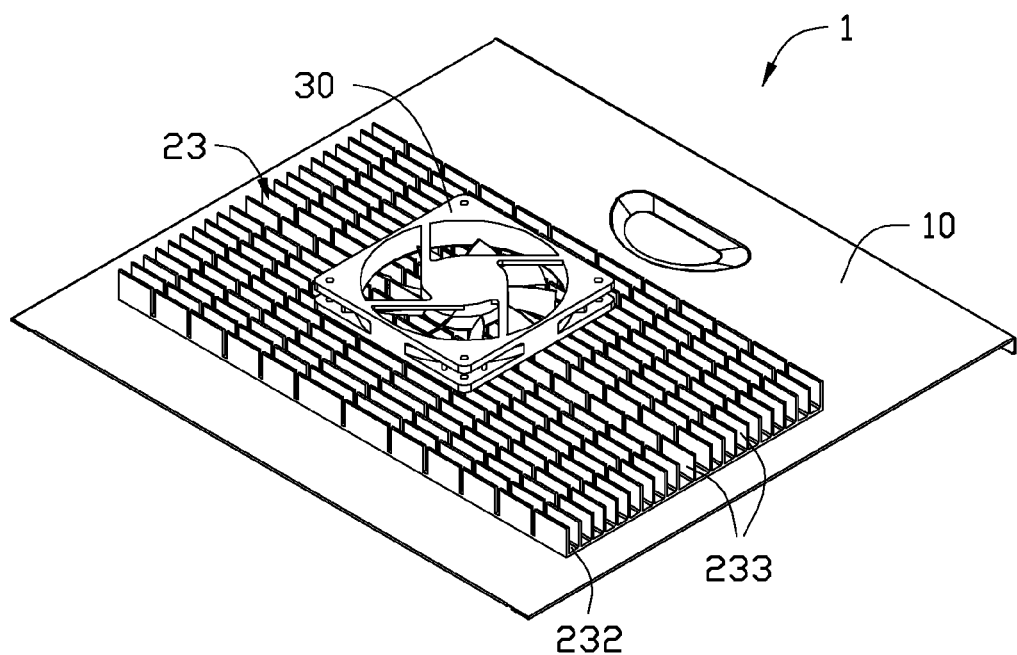
FIG. 2 is similar to FIG. 1, but viewed from a different viewpoint.

Referring to FIGS. 2 and 3, the side panel 10 defines an opening 110. The liquid cooling assembly 20 includes a container 21, a tube 22, a second heat sink 23 and a pump 24. The second heat sink 23 is fixed to the outer surface of the side panel 10 and covers the opening 110. In the embodiment, the second heat sink 23 is fixed to the side panel 10 by screws 112 passing through holes 111 defined in the side panel 10 and screwed into the holes 230 defined in the second heat sink 23. The second heat sink 23 includes a first side 231 abutting against the outer surface of the side panel 10 and facing the opening 110, and a second, opposite side 232. In the embodiment, the second side 232 includes a number of protruding fins 233.

The container 21 stores coolant and is fixed to the first side 231 of the second heat sink 23. The pump 24 is connected to one end of the container 24. The tube 22 is fixed to the first side 231 of the second heat sink 23 and includes a number of U-shaped segments connected to each other and remaining in contact with the first side 231. The tube 22 includes a first end 221 connected to the pump 24 and a second end 222 connected to the inlet 402 of the channel 401 of the first heat sink 40. In the embodiment, the second end 222 is connected to the inlet 402 through a soft pipe 40a. Similarly, the outlet 403 of the channel 401 of the first heat sink 40 is connected to the container 21 through a soft pipe 40b.

The container 21, the tube 22, the pump 24, and the channel 401 of the first heat sink 40 form a closed loop passage. In use, the pump 24 is started to circulate the coolant in the closed loop passage, causing the heat of the first heat sinks 40 that is transferred from the electronic components 42 and 42 to be transferred to the coolant. The transferred heat of the coolant is further transferred to the second heat sink 23 and is finally dissipated to the air. In the embodiment, to facilitate the dissipation, a fan 30 is mounted on the fins 233 of the second heat sink 23.

While various embodiments have been described and illustrated, the disclosure is not to be construed as being limited thereto. Various modifications can be made to the embodiments by those skilled in the art without departing from the true spirit and scope of the invention as defined by the appended claims.

What is claimed is:

1. A computer casing for cooling an electronic component, comprising:
    a first heat sink to be attached to one of the plurality of electronic components, and defining a channel, the channel comprising an inlet and an outlet;
    a side plate defining an opening;
    a second heat sink fixed to the side plate and covering the opening, the second heat sink comprising a first side facing the opening of the side plate and a second, opposite side facing outside;
    a container configured to store coolant and fixed to the first side of the second heat sink;
    a pump connected to the container;
    a tube comprising a first end connected to the pump and a second end connected to the inlet of the channel of the first heat sink, the tube staying in contact with the first side of the second heat sink to transfer heat of the coolant to the second heat sink;
    wherein the outlet of the channel of the first heat sink is connected to the container, the container, the pump, the tube and the channel of the first heat sink form a closed loop passage, and the pump is configured to provide circulation of the coolant through the closed loop passage, thereby cooling the first heat sink.

2. The computer casing according to claim 1, wherein the first side of the second heat sink is planar.

3. The computer casing according to claim 1, wherein the tube comprises a plurality of U-shaped segments connected to each other.

4. The computer casing according to claim 1, wherein the second side of the second heat sink comprises a plurality of fins.

5. The computer casing according to claim 1, further comprising a fan fixed to the second side of the second heat sink.

\* \* \* \* \*